United States Patent [19]

Leverenz

[11] Patent Number: 4,542,283
[45] Date of Patent: Sep. 17, 1985

[54] ELECTRICAL HEAT LOSS CONTROL FOR BUILDING PERIMETER EMPLOYING PLURAL HEATERS

[76] Inventor: Jacques T. Leverenz, 1014 Pontiac, Wilmette, Ill. 60091

[21] Appl. No.: 592,380

[22] Filed: Mar. 22, 1984

[51] Int. Cl.⁴ .............................................. H05B 1/02
[52] U.S. Cl. .................... 219/483; 219/486; 340/589; 374/121; 307/39
[58] Field of Search ............... 219/494, 213, 483, 486, 219/492, 493, 507–509; 340/588, 589; 165/12; 374/25, 29, 121; 307/39–41

[56] References Cited

U.S. PATENT DOCUMENTS

| | | | |
|---|---|---|---|
| 3,450,862 | 6/1969 | Kralovec, Jr. ........................ | 219/494 |
| 4,274,475 | 6/1981 | Rall et al. .................................. | 165/12 |
| 4,372,690 | 2/1983 | Berman et al. ........................ | 374/121 |

Primary Examiner—M. H. Paschall
Attorney, Agent, or Firm—Kinzer, Plyer, Dorn & McEachran

[57] ABSTRACT

A perimeter heat loss control system for electrical heaters and/or radiant ceiling panels around the periphery of a building has the heaters divided into zones, usually one zone for each outside wall. In a zone, a radiant heat responsive heat flow sensor faces the outside wall for the zone and generates a wall heat rate signal; a thermal sensor is positioned adjacent to one heater to generate a heat rate signal. A zone comparator uses the sensor signals to generate an error signal representative of deviation of the differential between the rate of heat flow through the zone wall and the rate of heat generation in the zone relative to a predetermined preset value. That error signal is applied to a power control to control all heaters in the zone, proportionally varying the input to the heaters until a balanced heat loss condition is realized.

12 Claims, 2 Drawing Figures

ELECTRICAL HEAT LOSS CONTROL FOR BUILDING PERIMETER EMPLOYING PLURAL HEATERS

BACKGROUND OF THE INVENTION

A common building heating system utilizes a series of electrical heaters around the periphery of the building to compensate for heat losses through the exterior building walls. These heaters may be supplemented by heating of air circulated through the building interior, particularly in office buildings, with thermostatic control of the air circulation system used to determine room temperatures. In any such system, changes in external environmental factors such as accumulation or dispersion of clouds, increase or decrease in wind velocity or change in wind direction, temperature variation, etc., cause appreciable changes in the rate of heat loss (or gain) through the walls, with a corresponding need for change in energization of the heaters. Moreover, heat flow conditions through each building wall are likely to be different from the other walls. Thus, at midday on a cold, sunny winter day the north wall of a building may exhibit a high rate of heat loss, the east and west walls may show moderate heat loss rates, and the south wall may exhibit a very low heat loss rate or even a net heat gain from the exterior to the interior due to solar load.

Various control systems have been proposed for peripheral electrical heating systems of this kind, intended to match the output of the heaters with the heat rate transfer through the building walls. One of the more successful systems is that described in Kralovec U.S. Pat. No. 3,450,862, which, in its most sophisticated version, includes an external solar heat sensor, a shielded outside thermal sensor intended to be independent of solar conditions, an outside temperature sensor, indoor thermostats, and an internal thermal sensor that monitors output of the heaters to afford a feedback for the control. That system, however, is subject to operational problems due to accumulation of snow or ice on any of the outside sensors or to physical damage to those sensors. A change in the environment (e.g., erection or removal of an adjacent building) can upset the control system calibration. And installation cost is high due to the need for connections through the building walls or roof and additional required wiring.

Another control for peripheral building heating systems, described in Rall et al U.S. Pat. No. 4,274,475, eliminates some of the aforementioned problems because it eliminates the outside sensors in favor of a thermopile differential sensor mounted on the inside of the building wall, often on a window. But the Rall et al arrangement requires mounting of the thermopile sensor in good heat exchange relation on the wall, a relationship not easily achieved and difficult to maintain over extended periods of time. And that control is likely to suffer from excessive hunting through failure to maintain effective monitoring of actual heater performance.

SUMMARY OF THE INVENTION

It is a primary object of the invention, therefore, to provide a new and improved zoned control for a building heating system of the kind comprising a multiplicity of electrical heaters around the periphery of a building.

Another object of the invention is to provide a new and improved zoned control for a peripheral building heating system, using multiple electrical heaters, that requires no sensors mounted on the building walls, inside or outside, yet affords a prompt and accurate control action responsive to changes in rate of heat flow through the building walls.

A specific object of the invention is to provide an accurate, rapidly responsive zoned control for a peripheral system of electrical heaters in a building that compensates for changes in rates of net heat flow through the exterior walls of the building, yet is relatively simple and inexpensive to install and remains reliable in operation over extended periods of time.

Accordingly, the invention relates to a building heating control for a building heating system of the kind comprising a multiplicity of electrical heaters located around the periphery of a building, adjacent to the outside walls of the building, with the heaters arranged in N zones each including a plurality of heaters along one wall. The heating control comprises N radiant heat responsive heat flow sensors, one for each zone, each heat flow sensor facing the outside wall for its zone in spaced relation thereto, which heat flow sensor generates a wall heat rate signal representative of the net rate of heat flow through the wall of its zone, and N thermal sensors, one for each zone, each thermal sensor positioned adjacent one of the heaters in its zone in spaced relation thereto, which thermal sensor generates a heater heat rate signal representative of the rate of heat generated by the heaters in its zone. There are N comparator means, one for each zone, to which both of the heat rate signals for that zone are supplied, for generating an error signal representative of deviation of the differential between the rate of heat flow through the wall and the rate of heat generation from the heaters in the zone relative to a predetermined preset differential. Further, there are N power control means, one for each zone, each power control means coupled to the comparator means and the heaters for its zone, for controlling electrical energization of the heaters in its zone in response to the error signal from the comparator means for its zone, increasing or decreasing energization of the heaters in its zone to maintain the error signal approximately at zero.

DESCRIPTION OF THE PREFERRED EMBODIMENT

Figure 1:
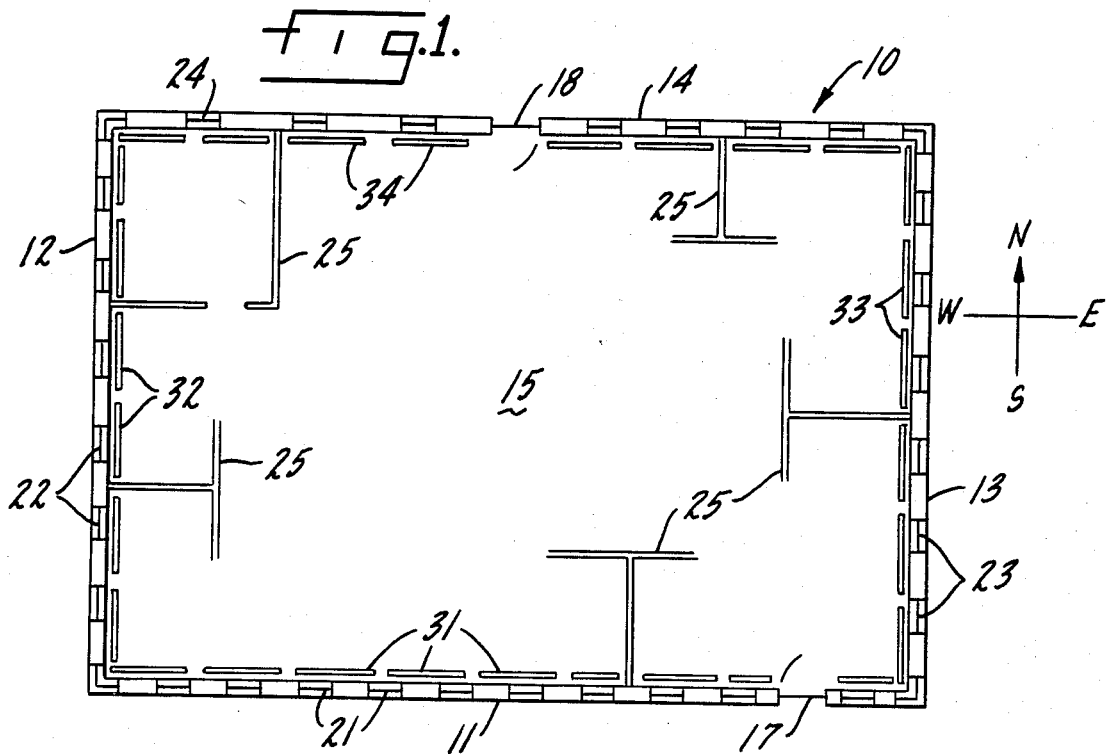
FIG. 1 is a simplified schematic plan view of a building including a heating system comprising a multiplicity of electrical heaters located around its periphery, to which a heating control according to the present invention may be applied.

FIG. 1 affords a simplified schematic illustration, constituting a plan view, of a building 10 that incorporates a heating system to which the heating control of the present invention may be applied. Building 10 includes a south wall 11, a west wall 12, an east wall 13, and a north wall 14. Building 10 further comprises a floor 15, assumed to be the ground floor, provided with appropriate doors 17 and 18; however, floor 15 may be any other building floor. The south wall 11 includes a series of windows 21; there are also windows 22, 23, and 24 in walls 12, 13, and 14 respectively. The interior of the building is provided with a variety of partitions 25, which are shown only incompletely because the nature and position of the interior partitions is essentially unimportant with respect to the present invention.

Building 10 includes a heating system comprising a multiplicity of electrical heaters that are located around the periphery of the building adjacent to its outside walls. Thus, along the south wall 11 there are a substantial number of electrical heaters 31. Adjacent the west wall 12 is a series of electrical heaters 32. A series of heaters 33 are arranged along the east wall 13 of the building, whereas a series of electrical heaters 34 are disposed along the interior of the north wall 14. For purposes of the present description, it may be assumed that all of the south wall electrical heaters 31 constitute a single heating zone for building 10 and that each of the series of heaters 32, 33 and 34 defines a single heating zone, so that there is one heating zone for each building wall 11–14. This zoning division is relatively arbitrary and represents the minimum number of zones that should be employed for building 10; if desired, the electrical heaters along one wall, such as the heaters 31 for south wall 11, could be divided into two or more heating zones. The heaters 31–34 are typically baseboard heaters, but may also be radiant ceiling heaters.

Figure 2:
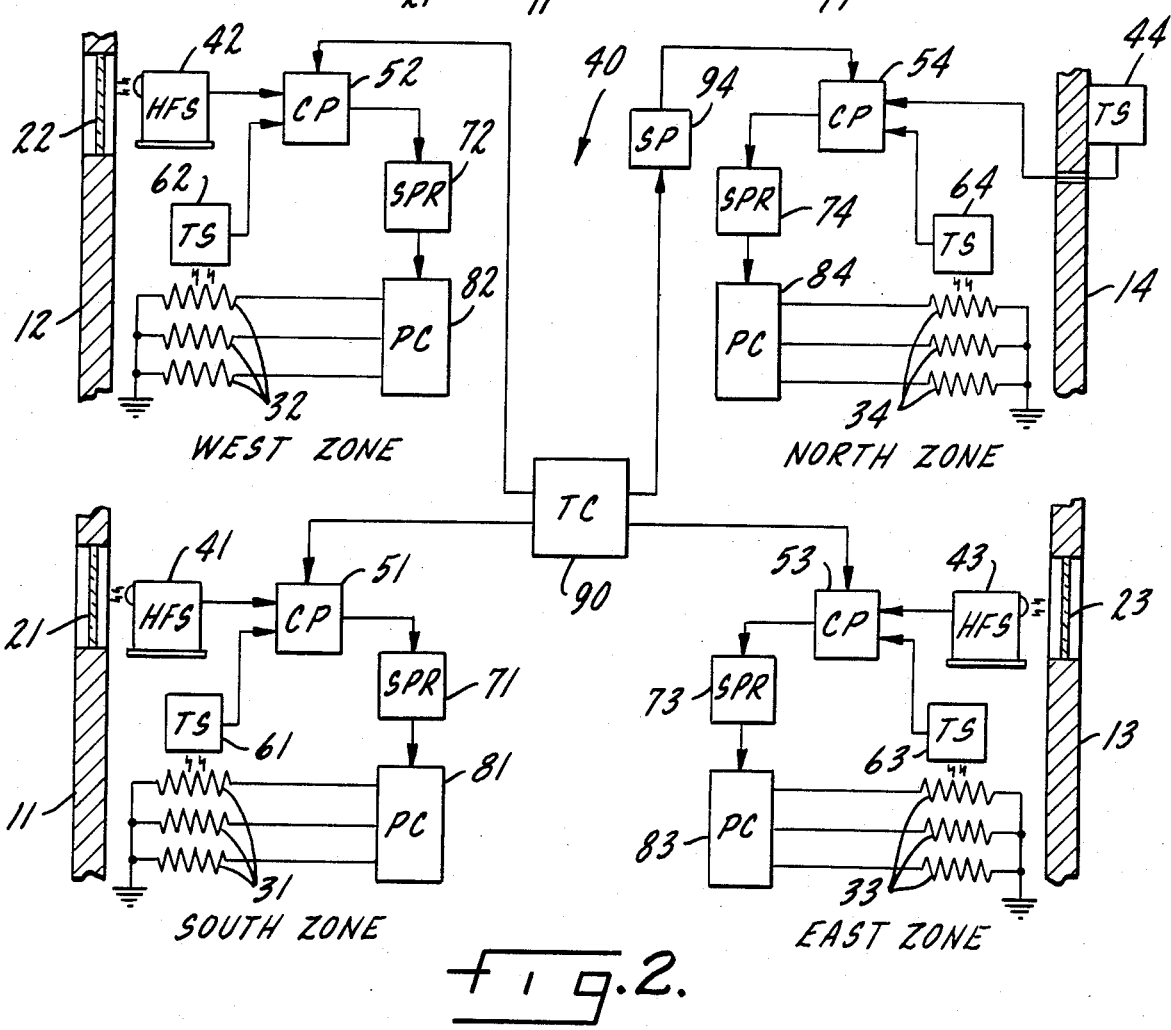
FIG. 2 is a block circuit diagram of a heating control constructed in accordance with a preferred embodiment of the present invention.

FIG. 2 illustrates a building heating control 40, constructed in accordance with one embodiment of the present invention, that may be utilized to control operation of all of the heaters 31–34 for the building 10 of FIG. 1. For the south heating zone, including all of the electrical heaters 31 along the south building wall 11, the heating control 40 includes a radiant heat responsive heat flow sensor 41 that is mounted within the building facing the south outside wall 11 but spaced from that wall. The heat flow sensor 41, sometimes referred to as a thermographic sensor, is of a type that detects thermal radiation from the portion of the wall 11 that it faces, in this instance one of the windows 21, and that also includes a temperature detector for detecting the temperature in its immediate vicinity. These two detected parameters are utilized, in sensor 41, to determine the net heat flow through the outer wall 11, specifically window 21, developing a wall heat flow signal that represents the rate of net heat loss or gain through the south wall 11. That is, the output signal from heat flow sensor 41 is representative of the rate of heat flow through the south wall 11. A radiant heat responsive heat flow sensor of this kind is described in Berman et al U.S. Pat. No. 4,372,690; a commercially available heat flow sensor suitable for use as sensor 41 is the Model EM-200 of Linear Corporation, Los Altos, Calif., the owner of the aforementioned Berman et al patent.

The output from heat flow sensor 41, FIG. 2, is utilized as one input to a comparator circuit 51. The comparator 51 may be a conventional two-input electronic bridge comparator having a predetermined set point. A second input to comparator 51 is derived from a thermal sensor 61 positioned adjacent to but in spaced relation to one of the south zone electrical heaters 31. The thermal sensor 61 may be of conventional type; it generates a heater output signal that is representative of the rate of heat output from the heaters 31 in the south zone of the building. Heaters 31 are all energized at the same level; consequently, only one thermal sensor 61 is required for all of the electrical heaters 31 in the south zone.

In comparator 51, the difference between the wall heat rate signal from heat flow sensor 41 and the heater heat rate signal from thermal sensor 61 is determined, affording a measure of the differential between the rate of heat flow through the south wall 11 and the rate of heat generation from the south wall heaters 31. That differential in heat rates is compared, in circuit 51, with a predetermined differential value that is preset into the comparator. This comparison enables comparator 51 to generate an error signal and that error signal is supplied to a power control means comprising a sequencing/paralleling control 71 and a power controller 81. In this power control means, circuit 71 is used simply to convert the DC output signal from comparator 51 into an appropriate control signal for controlling the firing intervals of conventional SCR or Triac power controls incorporated in the power controller 81. Power controller 81 is connected in the energizing circuits for each of the south zone electrical heaters 31, increasing or decreasing the portions of the cycles of A.C. power supplied to those heaters. In this way, the power controller adjusts the heat output of heaters 31 to maintain the error signal output from comparator 51 at approximately a zero level.

The zone controls for the west zone electrical heaters 32 and the east zone electrical heaters 33, in system 40 (FIG. 2), are essentially the same as described for the south zone heaters 31. Thus, in the west zone control shown in the upper left hand corner of FIG. 2, a radiant heat responsive heat flow sensor 42 is positioned in the zone in facing relation to but spaced from wall 12, preferably aimed at one of the windows 22 in that wall. The output from sensor 42 and the output from a thermal sensor 62 are both supplied to a comparator 52 to enable the comparator to generate an error signal representative of deviation of the differential between the rate of heat flow through wall 12 and the rate of heat generation from heaters 32 relative to a predetermined value that has been preset into the comparator 52. The output signal from comparator 52 is supplied to a power control means comprising a sequencing circuit 72 and a conventional solid state power (SCR or Triac) control circuit 82.

The east zone control is the same, including a heat flow sensor 43 and a thermal sensor 63 both connected to a comparator 53. The output from comparator 53 is connected to a sequencing circuit 73 and power controller 83, with circuits 73 and 83 conjointly affording a power control that determines the rate of heat output from the zone heaters 33 adjacent the east wall 13 of the building.

In heating control system 40 the control for the electrical heaters 34 along the north wall 14 of the building could be the same as for the other zones. Indeed, that would be the preferred arrangement if there were no true north wall for building 10. In the specific building heat control illustrated in FIG. 2, however, the north zone control is slightly different from the other zones. As before, it includes a comparator 54 with one input derived from a thermal sensor 64 positioned adjacent to one of the north zone electrical heaters 34. The second input to comparator 54, however, is derived from a simple thermal sensor 44 located on the outside of the north wall 14 of the building. The remainder of the control is similar to that employed in the other zones, with the output of comparator 54 being supplied to a power control means comprising a sequencing circuit 74 and a solid state switching power control circuit 84.

As thus far described, the controls for the four zones of building 10, FIG. 1, as illustrated in FIG. 2, are essentially independent of each other. In the preferred system, however, there is one aspect of the control that applies to all of the zones. Thus, a timing controller 90 is incorporated in control 40, and has outputs connected to all of the zone comparators 51-54. The output to comparator 54 in the north zone control is supplied through a set point circuit 94.

The timing control 90 may comprise a simple twenty-four hour settable timer or, in more sophisticated systems, may constitute a programmable seven day timer. Regardless of the type employed, timing control 90 has two basic operating conditions. In a business building, one operating condition for timer 90 covers the hours during which building 10 is usually occupied and the other covers hours when the building is usually unoccupied. Thus, for an office building, employing a twenty-four hour timer, the timing control 90 would be set to its occupied condition for a period encompassing normal business hours, with actuation to the unoccupied condition for the balance of the day. A seven day timer may be programmed for the same arrangement for five days of the week, with perhaps a shorter occupied period for Saturday and with Sunday programmed to remain in the unoccupied condition throughout the day. For a residential building, a simple division into day and night operating conditions would be employed for timing control 90.

Timing control 90 also includes a relay having a set of contacts connected to each of the comparators 51-54, with the relay (or relays) being actuated by the timer. The purpose of the timing control 90 is to change the set point for each of the comparators 51-54, allowing the building temperature to be reduced during unoccupied periods or nighttime periods by lowering the preset differential values of the comparators, thus permitting a limited increase in heat flow through the outside building walls at night or while the building is unoccupied. For some commercially available comparator devices, this can be accomplished simply by switching a resistor into and out of the comparator circuit. Other comparable arrangements may be employed as desired, depending upon the type of comparator utilized.

In order to afford a more explicit example of the manner in which the heating control of the present invention may be implemented, specific control units that may be utilized in a typical control system are identified hereinafter. It should be understood that this specific circuit information is provided solely by way of example and in no sense as a limitation on the invention.

Each of the heat flow sensors 41-43 may constitute a model EM-200 thermographic sensor as manufactured by Linear Laboratories Division of Linear Corporation, Los Altos, Calif. That heat flow sensor provides an instantaneous and continuous measure of heat loss or gain through the exterior wall of a building and is customarily calibrated to provide an output signal of 7.5 volts DC for zero net heat transfer (loss or gain) through the exterior building wall. The output signal amplitude from this instrument is a linear function of heat loss and the operating range for net heat loss conditions typically extends from 2.5 volts DC, indicating a heat loss of 63.53 btu/hr/sq.ft., to the previously noted 7.5 volts for zero heat loss. For a heat gain through the exterior wall the instrument again provides a linear function, with an output voltage of 10 volts DC indicative of a heat gain of 31.76 btu/hr/sq.ft. When mounted at a distance of six feet from the wall, this sensor effectively "views" a wall area eight inches in diameter; of course, an unobstructed view should be provided.

The outdoor temperature sensor 44 that could be north zone of the building, in the specific circuit arrangement shown in FIG. 2, may be a Type TS-8501 thermal sensor having a range of $-40°$ to $+250°$ F. The indoor thermal sensors 61-64, one used in each building zone, may be Type TS-8261, having the same temperature range. The comparators 51-54, one used in each building zone, may be Type CP-8102 dual input electronic bridge controllers, each including a direct function bridge comparison circuit and an inverse function bridge comparison circuit; for each of the south, east, and west zones the direct function bridge is employed whereas for the north zone, utilizing a temperature sensor instead of the heat flow sensor employed in the other zones, the inverse function bridge is utilized. Each of the sequencing circuits 71-74 may constitute a Type AD-8101 electronic module. The set point control device 94 may be a Type AT-8122 remote set point adjuster having a range of 20° to 120° F. All of the control units listed in this paragraph are available from Barber-Colman Company, Loves Park, Ill.

For the power controllers 81-84, the Series 313 SCR controllers available from Robicon Corporation, Pittsburgh, Pa., may be utilized.

A preferred timer for timing control 90 is Type Digi 1272, available from Grasslin Controls Corp., Ramsey, N.J. This particular control unit is a seven day solid state digital day-night timer with a quartz crystal control for the internal clock. The relays required for the timing control may be of any preferred type.

In the foregoing description, it is implicitly assumed that heaters 31-34 are simple radiant electrical heaters. It should be understood, however, that the overall heating system for building 10 may include appropriate fans for directing heated air from these heaters up along the inner surface of the building walls 11-14. Furthermore, in a modern sealed building having an air circulation system, the overall building heating arrangement would include thermostat controlled heating apparatus for the air circulated throughout the building, with the building divided into various zones for this purpose as well. In such a building, the temperature level within any given area may be adjusted by adjustment of the heaters employed for air circulation, with the heaters 31-34 being utilized to compensate for heat los through the exterior walls in a manner that does not preclude adjustment of room temperature within a limited comfort range suited to individual occupants.

For relatively warm outside conditions there may be a net heat flow through any exterior building wall, particularly the south wall 11, from the outside of the building to its interior. Under these conditions, of course, all of the electrical heaters along any such wall are kept de-energized. If desired, the outputs from the heat flow sensors 41-43 may be utilized as part of a control for air conditioning equipment, since these sensors do afford output signals indicative of heat flow into the building as well as out of the building.

In control system 40, FIG. 2, many of the components may be located in a single control panel located anywhere within the building, usually at a central location which may coincide with the electrical panelboard supplying power to the building, including heaters 31-34. Thus, all of the comparators 51-54, sequencing circuits 71-74, timing control 90, and set point control 94 can be located in a single control panel.

With the control of the present invention, no outdoor sensors are required, eliminating operational errors which may result from physical damage, ice or snow cover, or other external environmental factors. Where an outside thermal sensor such as sensor 44 is used for the north zone, as shown in FIG. 2, the likelihood of difficulties of this kind is minimized because that sensor is not dependent upon radiation conditions with respect to the sun and is not likely to remain covered with snow or ice except under conditions where the wall temperature is well below freezing. Installation costs are minimized and the system requires no re-calibration due to changes in external conditions such as the erection of a new building immediately adjacent to building 10. The control is highly responsive to changes in conditions outside of the building that produce changes in heat transfer through the building walls; on the other hand, the control is not subject to appreciable "hunting" in its operation. The effective feedback incorporated in the control system, comprising the internal thermal sensors 61-64 and their connections to the comparators 51-54, provides for maximum efficiency in operation of the building heating system.

I claim:

1. A building perimeter heat loss control for a building of the kind having a multiplicity of electrical heaters located around the periphery of the building, adjacent to the outside walls of the building, with the heaters arranged in N zones each including a plurality of heaters along one wall, the perimeter heat loss control comprising:

N radiant heat responsive heat flow sensors, one for each zone, each heat flow sensor facing the outside wall for its zone in spaced relation thereto, which heat flow sensor generates a wall heat rate signal representative of the rate of heat flow through the wall of its zone;

N thermal sensors, one for each zone, each thermal sensor positioned adjacent one of the heaters in its zone in spaced relation thereto, which thermal sensor generates a heater heat rate signal representative of the rate of heat generation by the heaters in its zone;

N comparator means, one for each zone, to which both of the heat rate signals for that zone are supplied, for generating an error signal representative of deviation of the differential between the rate of heat flow through the wall of the rate of heat generation from the heaters in the zone relative to a predetermined preset differential;

and N power control means, one for each zone, each power control means coupled to the comparator means and the heaters for its zone, for controlling electrical energization of the heaters in its zone in response to the error signal from the comparator means for its zone, increasing or decreasing energization of the heaters in its zone to maintain the error signal approximately at zero.

2. A building perimeter heat loss control according to claim 1 and further comprising timing control means, connected to all of the comparator means, for changing the preset differential between a first value for periods during which the building is normally occupied and a second value for periods during which the building is normally unoccupied.

3. A building perimeter heat loss control according to claim 2 in which the preset differential value for occupied periods is smaller than the preset differential value for unoccupied periods.

4. A building perimeter heat loss control according to claim 3 in which the preset differential value for occupied periods is approximately zero.

5. A perimeter heat loss zone control for one zone of a building of the kind having a multiplicity of electrical heaters located around the periphery of the building, adjacent to the outside walls of the building, to compensate for heat losses through the building perimeter, with the heaters arranged in a number of zones each including a plurality of heaters, at least one zone for each outside wall, the perimeter heat loss control comprising:

a radiant heat responsive heat flow sensor, facing the outside wall for the zone in spaced relation thereto, which generates a wall heat rate signal representative of the rate of heat flow through the wall;

a thermal sensor, positioned adjacent one of the heaters in the zone in spaced relation thereto, which generates a heater heat rate signal representative of the rate of heat generation by the heaters in the zone;

comparator means, to which both of the heat rate signals are supplied, for generating an error signal representative of deviation of the differential between the rate of heat flow through the wall and the rate of heat generation from the heaters in the zone relative to a predetermined preset differential;

and power control means, coupled to the comparator means and the heaters in the zone, for controlling electrical energization of the heaters in the zone in response to the error signal, increasing or decreasing energization of the heaters to maintain the error signal approximately at zero.

6. A perimeter heat loss zone control according to claim 5 in which the preset differential is approximately zero.

7. A perimeter heat loss zone control according to claim 5 in which the heat flow sensor faces a window in the outside wall for the zone.

8. A perimeter heat loss zone control according to claim 7 in which the preset differential is approximately zero.

9. A perimeter heat loss zone control according to claim 5 and further including timing control means, connected to the comparator means, for changing the preset differential between a first value for periods during which the building is normally occupied and a second value for periods during which the building is normally unoccupied.

10. A perimeter heat loss zone control according to claim 9 in which the preset differential value for occupied periods is smaller than the preset differential value for unoccupied periods.

11. A perimeter heat loss zone control according to claim 10 in which the preset differential value for occupied periods is approximately zero.

12. A perimeter heat loss zone control according to claim 11 in which the heat flow sensor faces a window in the outside wall for the zone.

* * * * *